United States Patent [19]
Polsky

[11] 3,927,863

[45] Dec. 23, 1975

[54] TRANSPORTABLE JACK

[76] Inventor: George Polsky, 6704 Merton Road, Cote St. Luc, Montreal, Quebec, Canada

[22] Filed: Sept. 3, 1974

[21] Appl. No.: 502,803

[52] U.S. Cl.............................. 254/103; 248/354 S
[51] Int. Cl.² .......................................... B66F 3/18
[58] Field of Search .................. 254/103; 248/354 S

[56] References Cited
UNITED STATES PATENTS

| 612,725 | 10/1898 | Haskin | 254/103 |
|---|---|---|---|
| 776,881 | 12/1904 | Ambrose | 74/424.8 R |
| 1,396,259 | 11/1921 | Coryell | 254/103 |
| 1,586,752 | 6/1926 | Koenigkramer | 254/103 |
| 3,176,963 | 4/1965 | Sturm | 254/103 |

FOREIGN PATENTS OR APPLICATIONS

| 383,580 | 10/1923 | Germany | 254/103 |

Primary Examiner—Othell M. Simpson

[57] ABSTRACT

A transportable jack for longitudinal displacement of a helical threaded bolt extending from a support shaft. The jack comprises a housing having a through bore therein. A ring gear is movably retained in the housing concentrically with the through bore. The ring gear has a vertical inner and outer annular wall. The inner annular wall has a helical thread formed throughout. A drive gear is retained in the housing and has at least one engageable end for imparting an axial rotational drive to the drive gear. The drive gear is in driving engagement with the outer wall of the ring gear to impart a circumferential drive to the ring gear. Engaging means are secured to the housing. The ring gear helical thread is threadably engaged with the bolt whereby the threaded bolt may be displaced longitudinally, with respect to the support shaft, by rotating the engageable end of the drive gear whilst maintaining the housing substantially stationary by the engaging means.

8 Claims, 4 Drawing Figures

U.S. Patent   Dec. 23, 1975   3,927,863
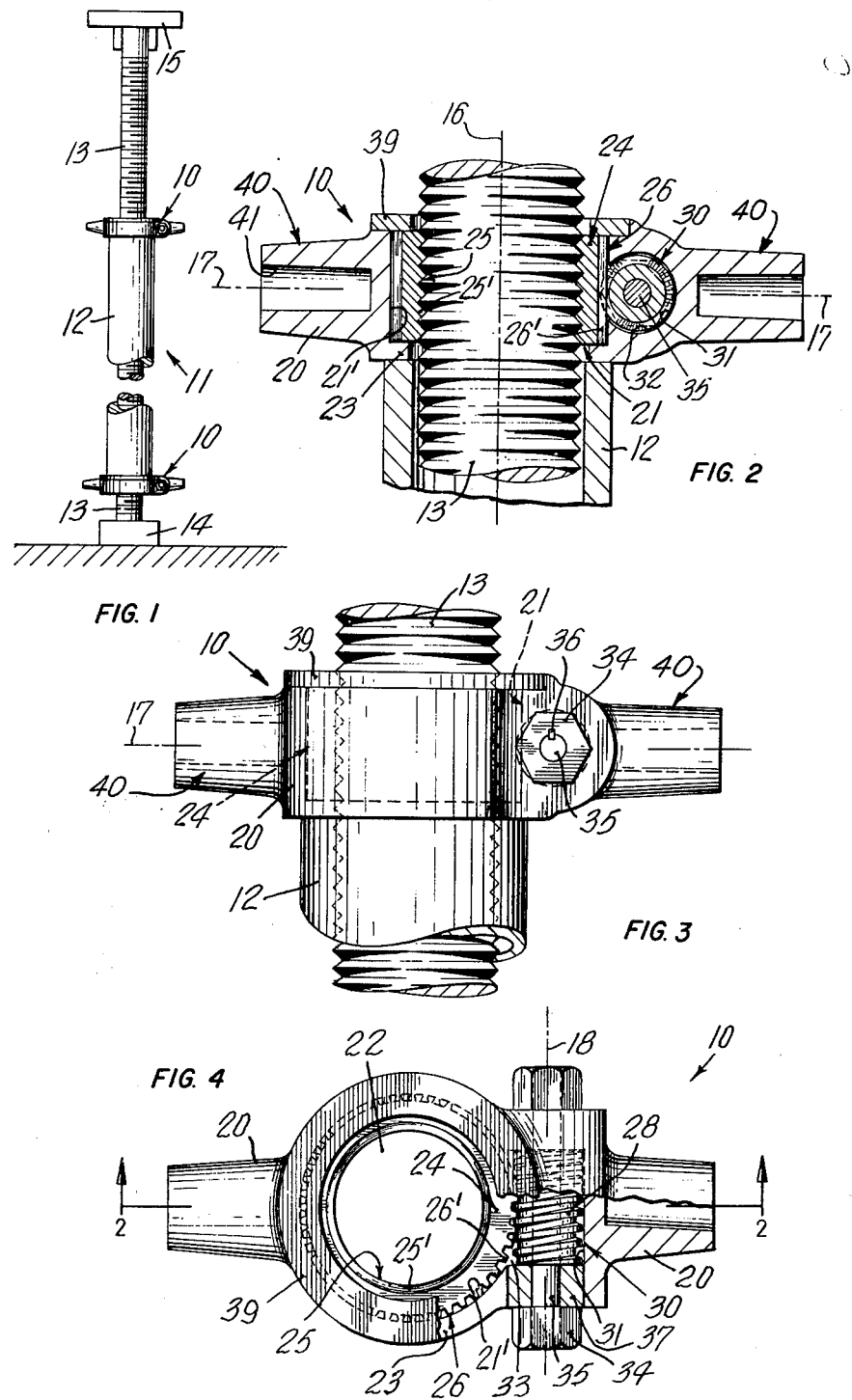

TRANSPORTABLE JACK

BACKGROUND OF INVENTION

A. Field of the Invention

The present invention relates to a transportable jack for longitudinal displacement of a threaded bolt received in a support shaft and particularly, but not exclusively, to a jack for use with scaffolding support structures.

B. Description of Prior Art

Scaffolding structures heretofore known comprise a plurality of support posts, each being adjustable in length from opposed ends thereof. These posts consist of an elongated tubular shaft having inner threads in the ends thereof for threaded engagement with a respective bolt section. By rotating the bolts, the bolt can be displaced into or out of the tubular shaft whereby the length of the support post is adjusted. Other structures utilize bolts which are slidably retained within a tubular shaft. The bolt is provided with a plurality of spaced apart holes whereby the length of the support post is adjusted by placing a locking bolt through the holes in the bolt whereby the locking bolt will rest against the end of the tubular shaft. All of these type structures require that a person adjust the length of a bolt relative to the tubular shaft ends, manually, this being a very time-consuming operation. Also, with these type support structures, it is sometimes very difficult to provide the adjustment of the bolt as it is not readily accessible when in position at the construction site, for example, the support post may be located very close to a wall or to another support post preventing easy access to the bolt for adjustment.

SUMMARY OF INVENTION

It is a feature of the present invention to provide a transportable jack for longitudinally displacing a helically threaded bolt threadably secured in a support shaft, and which substantially overcomes all of the above-mentioned disadvantages.

It is another feature to provide a transportable jack which may be utilized with threaded bolts in a scaffolding structure, which bolts are provided both at the top and bottom of a support shaft. Also, the jack may be operated by both left or right-hand.

It is a further feature of the present invention to provide a jack which is operable by an impact wrench thereby providing very rapid adjustment of a scaffold support post.

A still further feature is to provide a transportable jack which is substantially economical to construct, which is strong, and safe to operate.

According to the above features, from a broad aspect, the present invention provides a transportable jack for longitudinal displacement of a helical threaded bolt extending from a support shaft. The jack comprises a housing having a through bore therein. A ring gear is movably retained in the housing concentrically with the through bore. The ring gear has a vertical inner and outer annular wall. The inner annular wall has a helical thread formed throughout. A drive gear is retained in the housing and has at least one engageable end for imparting an axial rotational drive to the drive gear. The drive gear is in driving engagement with the outer wall of the ring gear to impart a circumferential drive to the ring gear. Engaging means are secured to the housing. The ring gear helical thread is threadably engaged with the bolt whereby the threaded bolt may be displaced longitudinally, with respect to the support shaft, by rotating the engageable end of the drive gear whilst maintaining the housing substantially stationary by the engaging means.

BRIEF DESCRIPTION OF DRAWINGS

A preferred embodiment of the present invention will now be described with reference to the accompanying drawings in which:

FIG. 1 is a fragmented side view of a scaffold support post structure utilizing the transportable jack of the present invention;

FIG. 2 is a fragmented side view showing a portion of a scaffolding structure where the jack is secured to the threaded bolt and rests against an end of a tubular support shaft;

FIG. 3 is a further side view similar to FIG. 2 showing the transportable jack; and FIG. 4 is a top view of the transportable jack structure.

DESCRIPTION OF PREFERRED EMBODIMENTS

Referring to the drawings, and more particularly to FIG. 1, there is shown generally at 10, the transportable jack of the present invention. Hereinshown, the jack is utilized with a scaffolding support post structure 11 which comprises a load support hollow tubular shaft 12 having a helically threaded bolt 13 received freely in each end thereof. The bottom bolt 13 is provided with a floor support bracket 14 whilst the free end of the opposite bolt 13, the top bolt, is provided with a suitable form support bracket 15 for supporting a load. As hereinshown, there are two transportable jacks 10 each provided and in abutment with a respective end of the tubular support shaft 12. The purpose of these transportable jacks 10 is to displace the threaded bolts 13 longitudinally with respect to the tubular shaft 12.

The construction of the transportable jack 10 will now be described with reference to FIGS. 2, 3 and 4. The jack 10 consists of a housing 20 formed of steel or any other suitable material. The housing 20 is provided with a ring gear cavity 21 having a circular vertical side wall 21'. A through bore 22 extends through the housing 20 transversely of the horizontal plane 17 of the housing. The ring gear cavity 21 is provided with a support flange 23 extending inwardly from a peripheral end edge of the cavity 21. A ring gear 24 is movably retained in the ring gear cavity 21 and in concentric alignment with the through bore. The ring gear is provided with a vertical inner and outer annular wall 25 and 26 respectively. The inner annular wall 25 is provided with a helical thread 25' extending thereacross. The outer annular wall 26 is provided with spaced apart projecting teeth 26' for engagement with a helical thread portion 28 of a drive gear 30 also retained in the housing 20.

The drive gear 30 is supported in a drive gear bore 31 which extends transverse to the through bore 22. The drive gear bore 31 has a circular side wall 32, a portion of which intersects with the side wall 21' of the ring gear cavity 21 to define an opening 33 to provide the driving engagement between the threaded portion 28 of the drive gear 30 with the projecting teeth 26' of the ring gear 24.

The drive gear 30 includes a drive shaft 35 extending through the bore 31, with the helical thread portion 28 being retained in the drive gear cavity between the ends of the drive shaft 35. The drive shaft 35 is provided with at least one engageable end constituted by a drive nut 34 being secured to the end of the drive shaft 35 by means of a key 36 or other suitable locking means. As shown in the drawings, the drive nut 34 is provided at each end of the shaft 35 exteriorly of the housing 20. Although not shown, brass bushings may be provided adjacent each end of the threaded portion 28 about the shaft 35. As shown in FIG. 4, the drive gear 30 is retained in the drive gear bore 31 by securing a plug 37 in the open end of the bore 31 about the shaft 35. It can be seen that by rotating the engageable end 34 of the drive gear 30 with suitable means, such as an impact wrench, this will impart an axial rotation drive to the drive gear 30 which in turn, because of its engagement with the ring gear, will impart a circumferential drive to the ring gear 24. The circumferential drive of the ring gear 24 will cause the bolt 13 to be displaced along its longitudinal axis 16.

The casing 20 is further provided with engaging means 40 hereinshown as an integral extension portion of the casing 20. The engaging means 40 is a projection extending longitudinally outwards of the casing and provided with an end cavity 41 whereby to permit the end of a handle bar (not shown) to be inserted therein. The bore 41 may be provided with a tapering side wall whereby to secure such handle bar. Alternatively, the bore 41 may have a particularly shaped cross section to positively engage the end periphery of the handle bar. As shown in the drawings, there are two such extension portions 40 each extending substantially along the central horizontal axis 17 of the housing and extending from opposite ends of the housing 20 substantially at right angles to the longitudinal axis 18 of the drive gear 30. The purpose of securing a handle bar to the housing is to maintain the housing substantially stationary whilst the drive gear is being rotated by the impact wrench. Otherwise, the housing 20 would have a tendency to turn about the bolt 13.

As shown in FIGS. 2 and 3, the ring gear 24 is retained in the cavity 21 by securing an annular collar 39 about the outer edge of the cavity 21 opposite the flange 23. The outer circumference of the through bore 22, formed by the inner surface of the collar 39 and the flange 23, is slightly larger than that of the threaded bolt 16 whereby to permit the bolt to move vertically therethrough without interference.

The construction of the jack is relatively simple and easy to assemble. Also, the gears are substantially sealed from intrusion of foreign matter when the jack is in position about the bolt 13. Also, the gears may easily be cleaned and the structure can easily be repaired. The purpose for providing the drive nuts 34 on opposite sides of the drive gear 30 is to permit the jack to be operated both from the right or left side. Also, the purpose of providing two opposite extension portions is also to provide engagement of the housing from either side. Further, although the flange 23 is provided with a flat outer surface as is the collar 39, these surfaces can be of different configuration for engagement with the end of any type support structure. These surfaces constitute support surfaces to support a threaded bolt 13 extending freely within their respective end of the tubular shaft.

In a further embodiment, the housing 10 may be of a slightly larger size whereby the inner diameter of the flange 23 is made larger than the outer diameter of the shaft 12 whilst still supporting the gear 24 in the housing. Thus, the housing 10 may be positioned on the end of the shaft 12 with the end edge of the shaft resting directly on the gear 24. The load on the bolt 13 would then be transferred to the shaft 12 directly through the gear 24.

In operation, the jack 10 is threadably secured in bolt 13 and positioned to rest on a circumferential end of the shaft 12. With the jack in this position, a handle bar (not shown) is engaged in the engageable bore 41 of the extension portion 40 to maintain the housing 20 substantially stationary on the end of the support shaft 12. An impact wrench (not shown) is engaged with the drive nut 34. By operating the impact wrench, this imparts a rotational drive to the drive gear 30. Seeing that the helical gear portion 28 is in threaded engagement with the projecting teeth 26' on the outer surface of the ringe gear 24, this will cause the ring gear to rotate circumferentially in the ring gear cavity 21. This circumferential drive causes the circumferential thread 25' to rotate about the threaded shaft ring whereby the bolt 13 will move up or down within the shaft, along its vertical axis 16, depending on the direction of the circumferential drive. Thus, it can be seen that the threaded bolt 13 can be caused to move very rapidly in and out of the tubular support shaft 12 resulting in a considerable time saving in the adjustment of the length of the support post structure 11.

I claim:

1. A transportable jack adapted to be positioned in frictional support engagement with an end of a hollow support shaft and for longitudinal displacement of a helical threaded bolt extending from said end of said hollow support shaft, said jack comprising a housing having a through bore therein, a ring gear movably retained in said housing concentrically with said through bore, said ring gear having a vertical inner and outer annular wall, said inner annular wall having a helical thread formed throughout, a drive gear retained in said housing and having at least one engageable end for imparting an axial rotational drive to said drive gear, said drive gear being in driving engagement with said outer wall of said ring gear to impart a circumferential drive to said ring gear, engaging means secured to said housing to prevent said housing from rotation about said bolt when an axial rotational drive is imparted to said drive gear, said ring gear helical thread being threadably engaged with said bolt whereby said jack rests on a circumferential end of said support shaft with said bolt freely extending within said hollow support shaft, said threaded bolt being displaced longitudinally with respect to said support shaft by rotating said engageable end of said drive gear whilst maintaining said housing substantially stationary by said engaging means.

2. A transportable jack as claimed in claim 1, wherein said outer annular wall is provided with spaced apart projecting teeth, said drive gear having a helical thread in a portion thereof in engagement with one or more of said teeth.

3. A transportable jack as claimed in claim 2, wherein said drive gear includes a drive shaft, said helical thread portion being retained in an enclosed cavity in said housing between the ends of said drive shaft, said engageable end being at least one end of said drive shaft.

4. A transportable jack as claimed in claim 3, wherein said engageable end is a drive nut secured to said at least one end of said drive shaft exteriorly of said housing.

5. A transportable jack as claimed in claim 1, wherein said engaging means is an extension portion of said casing projecting longitudinally outwards of said casing to a free end.

6. A transportable jack as claimed in claim 5, wherein said extension portion extends substantially along the central horizontal axis of said housing, and an engageable bore in said free end of said extension.

7. A transportable jack as claimed in claim 6, wherein said extension portion projects along a horizontal axis which is substantially at right angles to the longitudinal axis of said drive gear, said extension portion being provided on at least one side of said housing.

8. A transportable jack as claimed in claim 1, wherein said housing comprises a ring gear cavity having a circular vertical side wall, a ring gear support flange extending inwardly from a peripheral end edge of said cavity, said ring gear being supported in said ring gear cavity between said support flange and an annular collar secured about said ring gear cavity on a peripheral edge opposite from said flange, a drive gear bore in a portion of said housing transverse to said through bore, said drive gear bore having a circular side wall, a portion of said side wall of said drive gear bore intersecting with said side wall of said ring gear cavity to define an opening to provide said driving engagement between said drive gear and said ring gear.

* * * * *